United States Patent
Ashar et al.

(10) Patent No.: US 7,281,308 B2
(45) Date of Patent: Oct. 16, 2007

(54) METHODS OF GENERATOR ROTOR REMOVAL IN A COMBINED-CYCLE STAG APPLICATION

(75) Inventors: Siddharth Navinchandra Ashar, Guilderland, NY (US); Thomas Bonner, Ballston Lake, NY (US); Richard Allen Bradt, Ballston Lake, NY (US); Thomas Arthur Wagner, Troy, NY (US); John Russell Yagielski, Scotia, NY (US)

(73) Assignee: General Electric Company, Schenectady, NY (US)

( * ) Notice: Subject to any disclaimer, the term of this patent is extended or adjusted under 35 U.S.C. 154(b) by 457 days.

(21) Appl. No.: 10/752,491

(22) Filed: Jan. 8, 2004

(65) Prior Publication Data

US 2005/0150095 A1 Jul. 14, 2005

(51) Int. Cl.
 *B23P 19/00* (2006.01)
 *B23P 6/00* (2006.01)
 *F02C 1/00* (2006.01)

(52) U.S. Cl. .................. 29/426.3; 29/426.5; 29/889.1; 29/402.08; 60/772

(58) Field of Classification Search .............. 29/889.1, 29/426.3, 426.1, 426.4, 426.5, 402.03, 402.08; 60/772

See application file for complete search history.

(56) References Cited

U.S. PATENT DOCUMENTS 5,609,018 A * 3/1997 Brem et al. ............... 60/39.182
5,701,731 A * 12/1997 Brem et al. .................... 60/772

FOREIGN PATENT DOCUMENTS

JP 58163246 A * 9/1983 ................ 29/426.1

* cited by examiner

*Primary Examiner*—David P. Bryant
*Assistant Examiner*—Sarang Afzali
(74) *Attorney, Agent, or Firm*—Nixon & Vanderhye, PC

(57) ABSTRACT

Support feet of a generator are mounted on foundation columns spaced laterally one from the other, with one column having a block in a recess for receiving the feet on one side of the generator. Guides on a radius and supported by the generator foundation extend through notches on the underside of the block. To locate an end of the generator displaced horizontally from the turbines, the generator is unloaded from the foundation and the block is removed. The generator is then loaded onto the guides and pivoted about a vertical axis to locate at least one end out of alignment with the axis of the turbines enabling removal of the generator rotor in an axial direction.

12 Claims, 7 Drawing Sheets

METHODS OF GENERATOR ROTOR REMOVAL IN A COMBINED-CYCLE STAG APPLICATION

BACKGROUND OF THE INVENTION

The present invention relates to a method of removing the generator rotor from an aligned gas turbine-generator-steam turbine configuration for maintenance and returning the generator to useful service in the aligned gas turbine-generator-steam turbine configuration.

A gas turbine, generator and steam turbine are typically axially aligned one with the other with the generator located between the gas and steam turbines whereby the turbines drive the generator rotor to produce electrical power. This configuration is known as a STAG (steam and gas) combined-cycle system. In the STAG combined-cycle system, it will be appreciated that the opposite ends of the generator are mechanically coupled to the gas and steam turbines, respectively. The components of these systems are generally mounted on foundations prepared for supporting these large system components. Typically, the generator rotor, i.e., the generator field, must be removed from the generator for scheduled maintenance or repair. With the three main components of the combined-cycle system secured to the foundation, however, and in axial alignment one with the other, it is not possible to remove the generator field axially due to the lack of clearance with respect to the turbines at opposite ends of the generator. Maintenance on the gas and steam turbines can typically be performed in situ because the turbine housings are split along a horizontal midline enabling removal of each upper casing the exposed rotors of the gas and steam turbines. This leaves the lower turbine casings resting on the foundation. However, because the generator is an electromagnetic component, it is not possible to split the generator rotor and casing at the centerline and lift the generator rotor from the generator in a vertical direction.

Prior maintenance has been performed on generator rotors in combined-cycle systems, primarily in two ways. Once the generators are mechanically uncoupled from the turbines, the generators are directly lifted from the foundation and moved to a laydown area in the plant where rotor removal in an axial direction is not hindered by the presence of other equipment. Heavy-duty lifting equipment typically on-site is used to perform that process. Another prior process for maintaining generator rotors requires a movable slab forming part of the foundation for the generator. With the generator located on the movable slab, the generator may be displaced transversely or laterally from between the turbines and thus moved to a position where the turbines do not interfere with axial removal of the generator field. See, for example, U.S. Pat. No. 5,701,731.

BRIEF DESCRIPTION OF THE INVENTION

In accordance with a preferred embodiment of the present invention, there is provided a method for removing the generator rotor by pivoting the generator about a vertical axis so that at least one end of the generator rotor is displaced horizontally from alignment with the associated turbine, enabling removal of the rotor axially from the generator housing and through the displaced end. To accomplish the foregoing, and in a preferred embodiment, a typical foundation arrangement having a pair of laterally spaced concrete columns on which the feet of the generator housing are supported has one of the columns recessed or notched out to form a cavity extending the length of the column. A support block, preferably a steel block, designed for supporting the generator and accommodating the harmonic and dynamic behavior of the generator, is disposed in the cavity for receiving and supporting the feet of the generator on one side of the generator foundation. The block includes lateral cutouts through which extend guides, e.g., tracks, disposed on a radius about a vertical axis and which tracks rest on the foundation columns.

To displace at least one end of the generator out of axial alignment with the gas or steam turbines and enable removal of the generator rotor, the generator is first released from the foundation. In a preferred embodiment and to accomplish this, a jacking arrangement is disposed between the foundation columns. The generator is unloaded from the foundation, including the block by lifting the generator from the foundation. The block is then removed. Thereafter, the generator is loaded onto rollers or wheels on the guides and the jacking arrangement is removed. In this configuration, the generator housing may be rotated about the vertical axis with the weight of the generator being borne by the tracks resting on the foundation. At least one end of the generator is therefore rotatably displaced from alignment with the associated turbine to permit removal of the generator rotor in an axial direction. Once maintenance is completed and the generator rotor is axially inserted back into the generator housing, the generator housing is rotated about the vertical axis into alignment with the turbines. The jacking arrangement then unloads the generator from the rollers and guides and the block is set back into its original position. Once the block is secured to the foundation, the generator is loaded onto the foundation, including the block, and realigned with the gas and steam turbines. It will be appreciated that significant savings in plant costs are obtained by enabling generator stator movement within the foundation. Additionally, the preferred method hereof reduces plant downtime and minimizes the lift capacity required at the operating site.

In a preferred embodiment according to the present invention, there is provided a method of axially removing a generator rotor from a generator housing wherein the generator is disposed axially between gas and steam turbines, comprising the steps of (a) releasing the generator from a foundation supporting the generator and (b) rotating the generator about a vertical axis and along guides to displace at least one end of the generator from axial alignment with one of the turbines to enable removal of the rotor from the casing without interference from one of the turbines.

In a further preferred embodiment according to the present invention, there is provided a method of axially removing a generator rotor from a generator housing wherein the generator is disposed axially between gas and steam turbines, comprising the steps of (a) unloading the generator from a foundation supporting the generator, (b) loading the generator onto guides extending horizontally and (c) rotating the generator about a vertical axis and along the guides to displace at least one end of the generator from axial alignment with at least one of the turbines to enable removal of the rotor from the casing without interference from the one turbine.

DETAILED DESCRIPTION OF THE INVENTION

Figure 1:
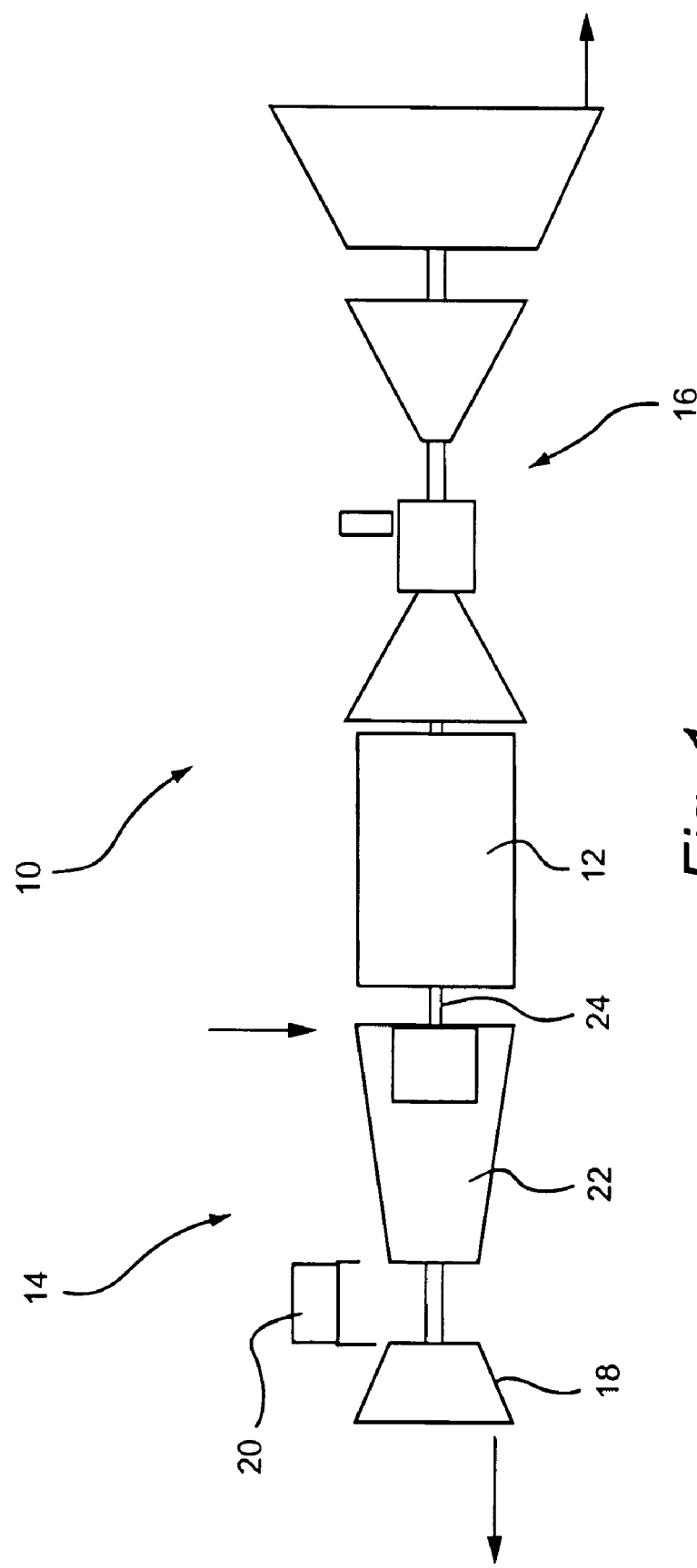
FIG. 1 is a schematic illustration of a STAG combined-cycle system.
Figure 4:
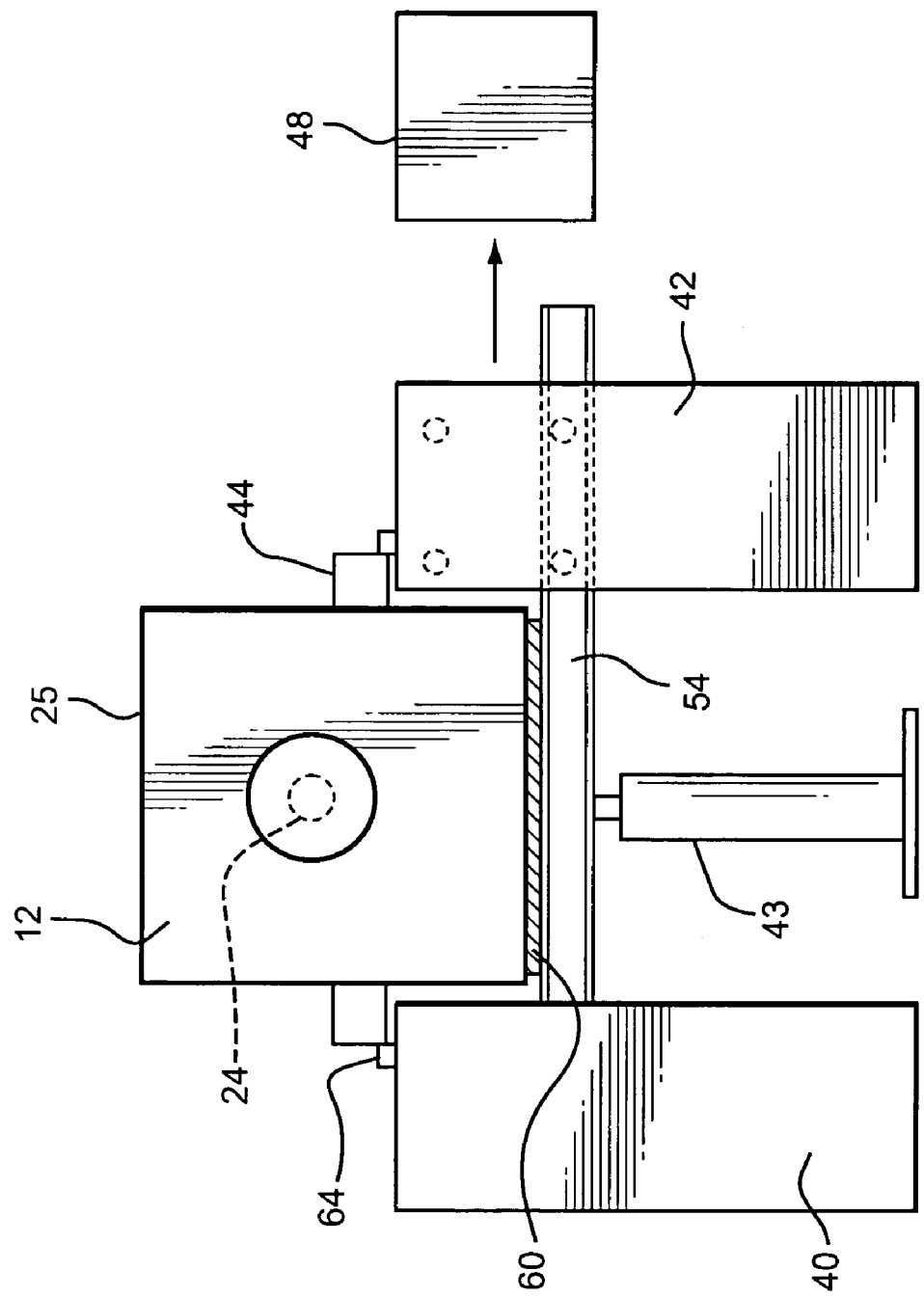
FIG. 4 is an end elevational view thereof.

Referring now to the drawings, particularly to FIG. 1, there is illustrated a STAG (steam turbine and gas turbine) combined-cycle system, generally designated 10, including a generator 12 in axial alignment with a gas turbine, generally designated 14, and a steam turbine, generally designated 16. As illustrated, the gas turbine 14 includes a compressor 18, a plurality of combustors 20 and a gas turbine section 22 for driving a rotor axially coupled to the generator rotor 24 within a generator housing 25 (FIG. 4). The generator rotor at the opposite end of the generator 12 is coupled to a series of high, intermediate and low pressure steam turbines which utilize the high temperature exhaust from the gas turbine and a heat recovery steam generator to convert the gas turbine exhaust into useful steam for the bottoming portion of the combined cycle. It will be appreciated that the generator rotor 24 is axially aligned with and coupled to the rotors of both the gas the steam turbines.

Figure 2:
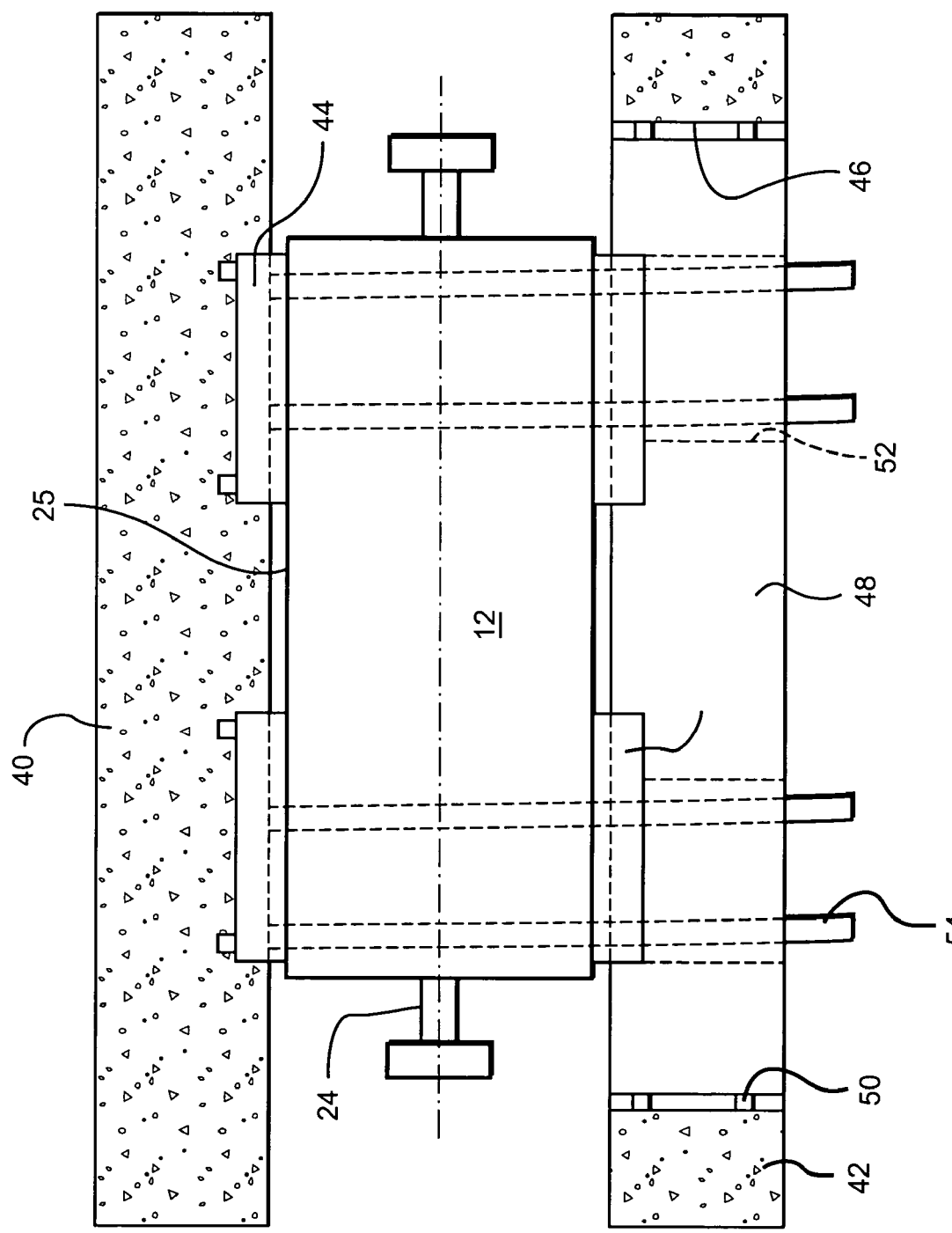
FIG. 2 is a plan view of a generator forming part of the STAG system mounted on a foundation in accordance with a preferred embodiment of the present invention.
Figure 3:
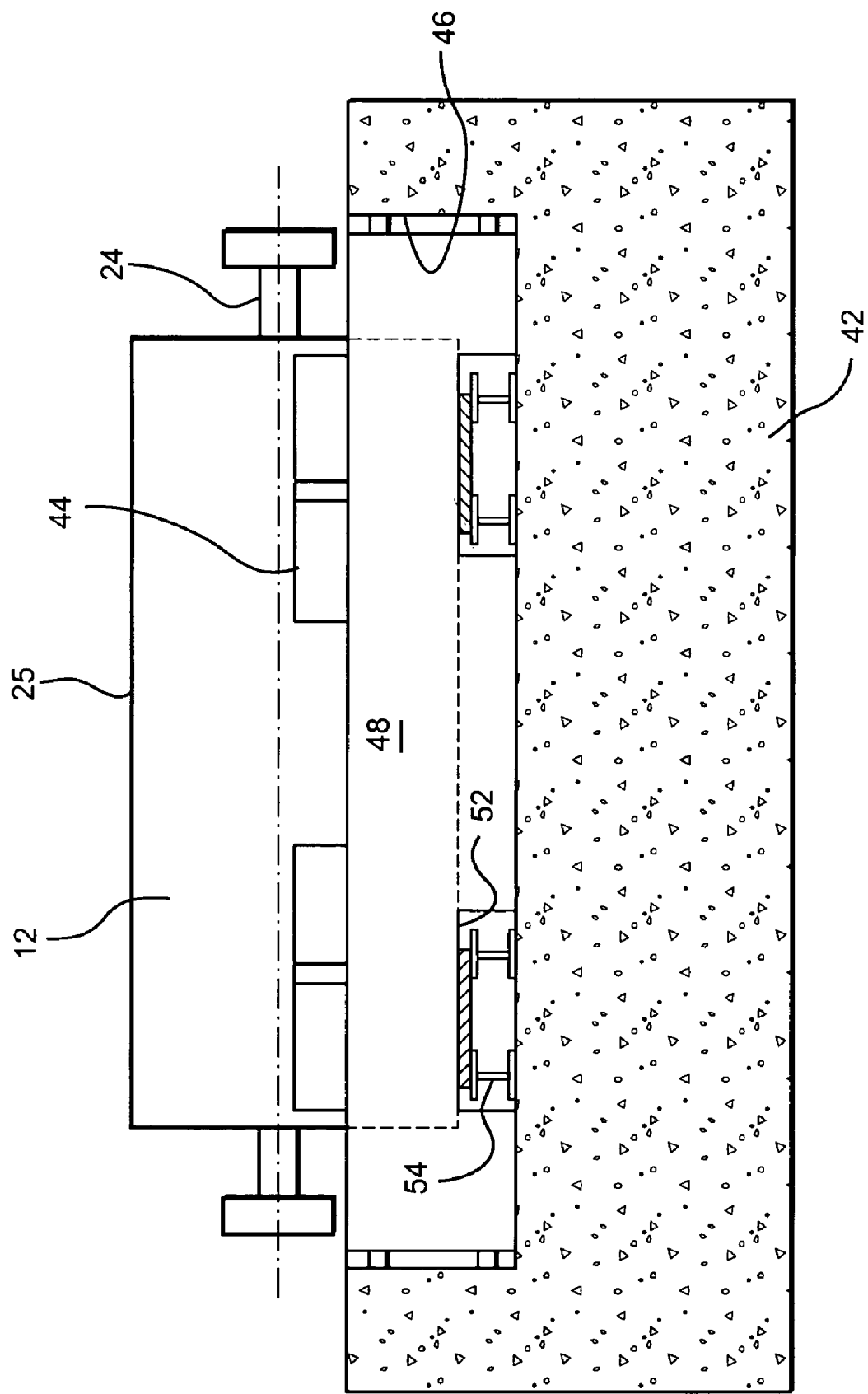
FIG. 3 is a side elevational view thereof.

Referring now to FIGS. 2 4, there is illustrated a foundation constructed in accordance with a preferred embodiment of the present invention for the generator housing 12. The foundation includes a pair of laterally spaced, elongated columns 40 and 42, preferably formed of concrete. The generator housing 12 includes feet 44 which are used to support the generator 12 from the foundation. Column 42, however, is different than foundation column 40. Column 42 has an elongated notch formed in its upper surface to provide a cavity or recess 46 for receiving a block 48, preferably a steel block. The steel block 48 mounted on the remaining portion of foundation column 42 is designed to support the generator and accommodate the harmonic and dynamic behavior of the generator. Guide pins 50 at opposite ends of the notch 46 maintain the block 48 in axial alignment with the column 42. As illustrated in FIG. 3, the undersurface of the block 48 includes a pair of notches 52 extending between opposite sides of block 48. The notches 52 receive guides 54, preferably in the form of a pair of rails for each notch. The guides 54 are supported at one end by column 40 and extend across the space between the columns 40 and 42 to rest on the base of the notch 46 of column 42. As illustrated in FIG. 2, the guides 54 have a radius based on a minimum angle the generator is required to move to clear the components, at least at one end of the generator. It will be appreciated, however, that in the operational condition, the feet 44 of the generator housing 12 are supported by the columns 40 and 42, with the feet 44 on one side of housing 12 being supported by block 48, the latter being in turn supported on column 42. The generator 12 is thus spaced from and not supported by the guides 54 in use.

In order to release the generator from the foundation and move the generator 12, jacking arrangements, schematically illustrated at 43 (FIG. 4), are rigged between the guides 54 and the base of the generator 12. The jacking arrangements are rigged at both ends of the machine. Using the jacking arrangements 43, the generator is unloaded from the foundation, i.e., feet 44 are raised or elevated from the foundation column 40 and the steel block 48. Once the generator 12 is unloaded from the foundation columns 40 and 42, the block 48 is removed, for example, by a crane or other lifting device, not shown. Once block 48 is removed, it will be appreciated that the cavity 46 of the foundation column 42 is open enabling the generator for movement in a lateral direction into the cavity.

Figure 5:
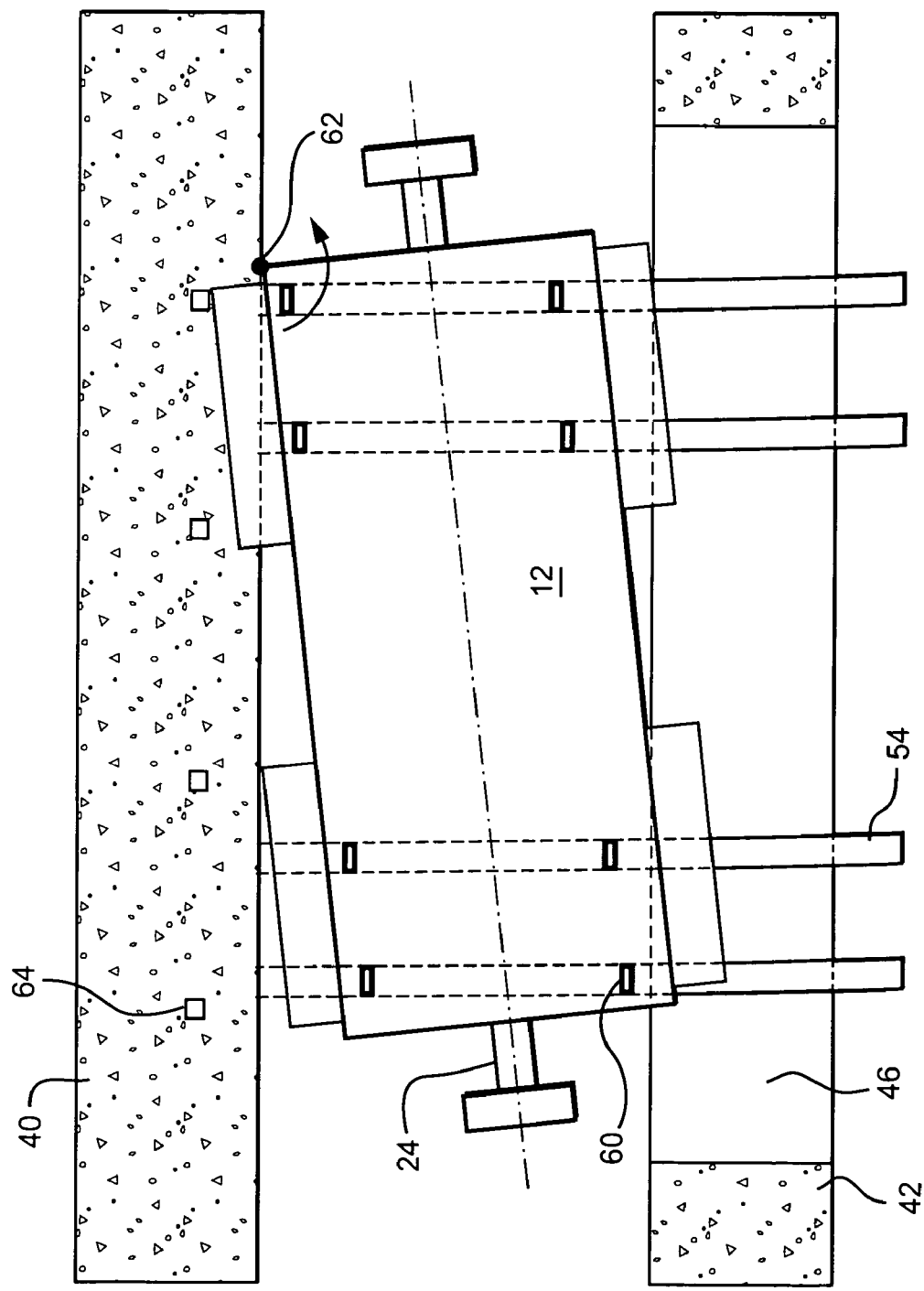
FIG. 5 is a view similar to FIG. 2 illustrating a generator rotated about a vertical axis into a position enabling removal of the generator rotor from the generator housing.
Figure 6:
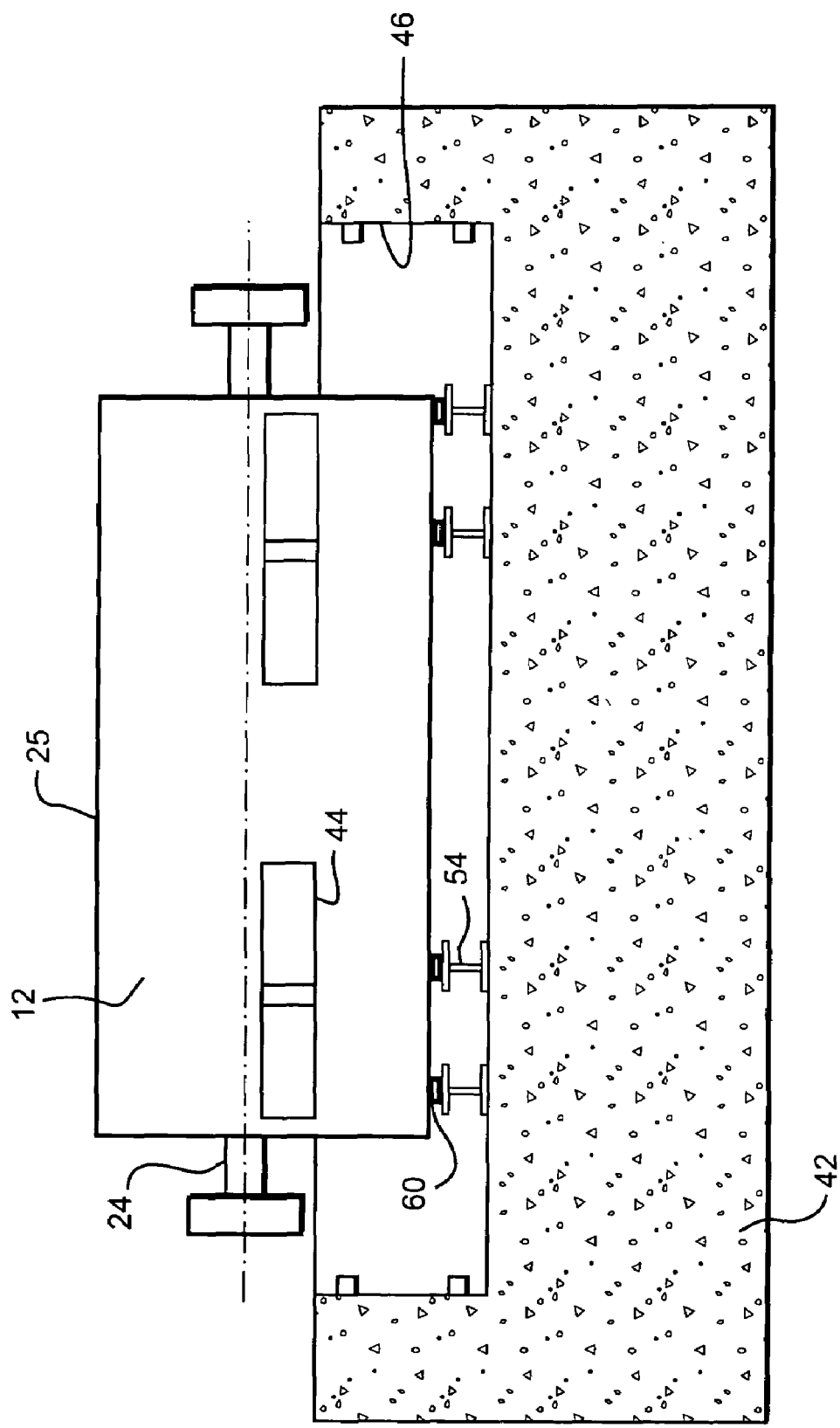
FIG. 6 is a side elevational view illustrating the generator housing mounted on the guides, facilitating pivotal movement.

Once the block 48 is removed, the generator 12 is loaded onto rollers or wheels 60 (FIG. 5) on the guides 54. Once the generator 12 is set on the rollers 60, the jacking arrangements are removed. It will be appreciated that the guides 54 now take the load of the generator 12, the guides 54 in turn being supported by foundation column 40 and the remaining portion of foundation column 42. With the generator 12 loaded on the guides 54 and feet 44 spaced above column 40 and 42, the generator 12 can be rotated about the vertical axis 62 (located to one side and at one end of the generator) as illustrated in FIG. 5 by applying a horizontal force in a horizontal plane preferably to the end of the generator 12 opposite the vertical axis 62. By displacing or rotating the generator 12 about axis 62, at least one end of the generator clears the associated turbine, enabling the generator rotor 24 to be removed from the generator 12 in an axial direction.

Once the maintenance work has been completed, the generator rotor may be re-installed into the generator housing and the generator moved back to its original axial-in-line position. To accomplish this, and with the original position of the generator feet 44 marked with pins 64 (FIG. 5) on the foundation column 40, the generator 12 is rotated about vertical axis 62 with the weight being supported by the guides 54. Once aligned in a vertical plane with the axes of the gas and steam turbines, the jacking arrangements 43 are used to unload the generator from the guides 54. Particularly, the jacking arrangements raise the generator to unload the wheels 60 and provide clearance for reinsertion of the block 48 into the cavity 46. Once the block 48 is positioned on column 42, the jacking arrangements 43 are used to lower the feet 44 of generator 12 onto the column 40 and steel block 48. The generator may then be realigned with and coupled to the gas and steam turbines and the plant placed in operation.

Figure 7:
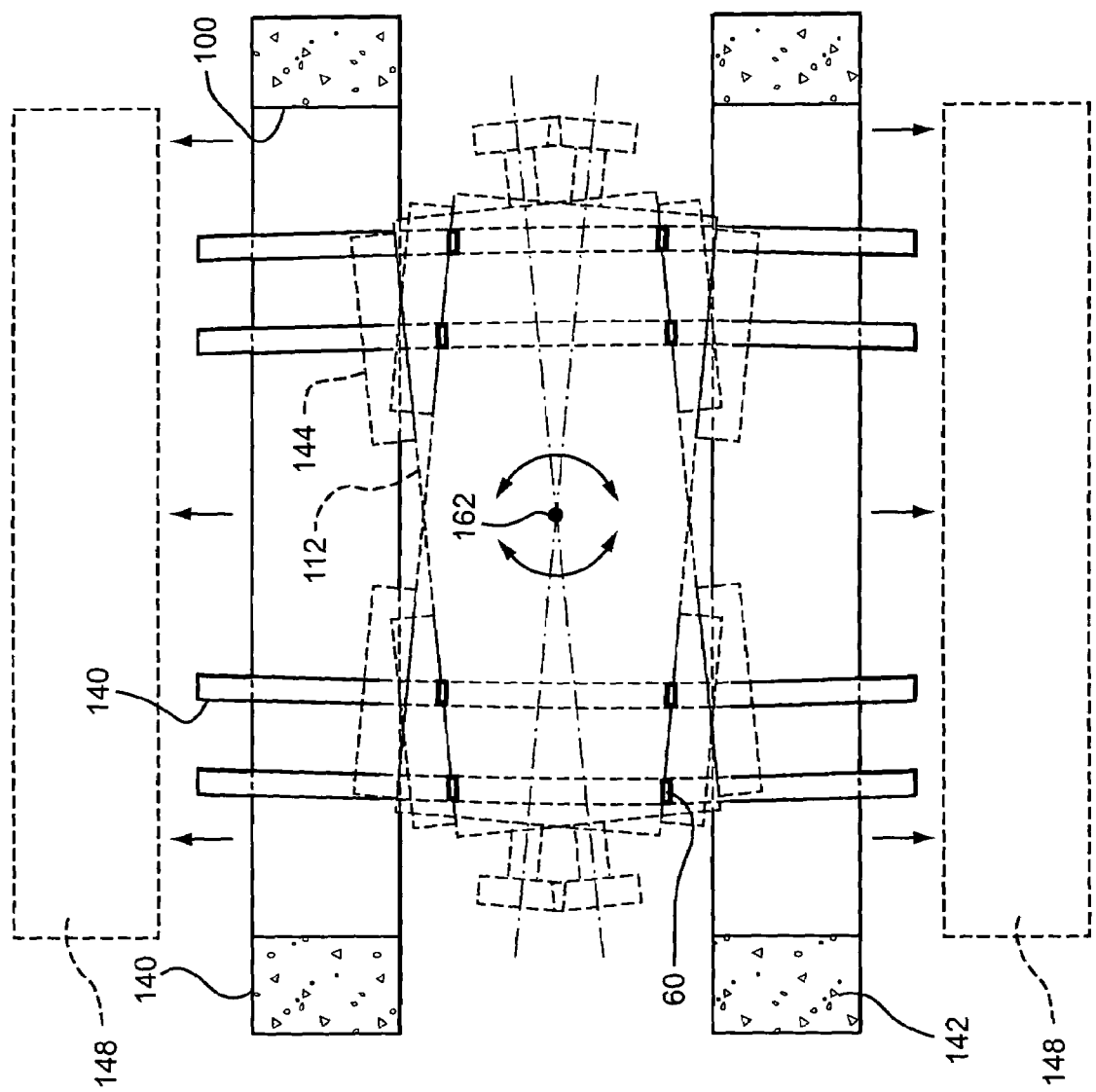
FIG. 7 is a plan view similar to FIG. 2 illustrating a further embodiment of the present invention.

Referring now to FIG. 7, wherein like reference numerals apply to like parts, preceded by the numeral 1, the vertical axis of rotation 162 may be located at or adjacent the center of the generator 112. To accomplish this, a second cavity is provided in the column 140 opposite column 142. A block 102 is disposed in the cavity 100, similarly as block 148 is disposed in the first foundation column 142. The block 102, similarly as block 148, has recesses along its underside to receive the guides 154 which lie on radii. Consequently, in use, the generator feet 144 rest on the blocks 148 and 102, with the guides 154 spaced below the undersurfaces of the block recesses. To rotate the generator 112 to a position locating opposite ends out of alignment with the associated turbines, the jacking arrangements unload the generator from the blocks 148 and 102 and the blocks 102 and 148 are removed from the foundation columns 140 and 142. The generator 112 is then loaded, e.g., lowered onto the wheels or rollers on the guides 154 whereby the guides 154, resting on the remaining notched-out portions of the foundation columns, 140 and 142 bear the entire load of the generator 112. The generator 112 can then be rotated about the vertical axis 162 through or adjacent to the centerline of the generator, locating the opposite ends to opposite sides of the axial centerline of the STAG system. In this way, both ends of the generator are exposed for removal of the generator rotor.

To replace the generator into the STAG system after maintenance has been performed, the generator 112 is rotated about the vertical axis 162 into alignment with the turbines. The jacking arrangements are used to unload the generator 112 from the guides 154. The blocks 102 and 148 are then located in the cavities 100 and 146. With the blocks replaced in those cavities, the generator can be loaded, e.g., lowered, so that the feet 144 of the generator rest on the blocks 102 and 148, supporting the generator from the foundation columns.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of removing a generator rotor from a generator housing wherein the generator is disposed axially between gas and steam turbines, comprising the steps of:
   (a) unloading the generator from a foundation supporting the generator;
   (b) loading the generator onto guides extending horizontally;
   (c) rotating the generator about a vertical axis and along said guides to displace at least one end of the generator from axial alignment with at least one of the turbines to enable removal of the rotor from the casing without interference from said one turbine; and
   wherein said foundation includes a block on one side of the generator and step (a) includes unloading the generator from the block, and removing the block from the foundation leaving an open recess through the one foundation side, and step (c) includes rotating the generator about the vertical axis through the recess.

2. A method according to claim 1 including, reinstalling the generator by subsequent to step (c), including rotating the generator about the vertical axis and along said guides to displace the generator into alignment with the steam and gas turbines, unloading the generator from the guides and loading the generator onto the generator foundation.

3. A method according to claim 2 wherein the step of unloading the generator from the guides includes elevating the generator relative to the foundation and the step of loading the generator onto the foundation includes lowering the generator onto the foundation.

4. A method according to claim 2 wherein step (c) further includes replacing the block onto the foundation when the generator is unloaded from the guides and the step of loading the generator onto the foundation includes lowering the generator onto the foundation including the block.

5. A method according to claim 1 including extending the guides through at least one opening in the block prior to step (a).

6. A method according to claim 1 including locating the vertical axis offset from an axial centerline of the generator.

7. A method according to claim 1 wherein step (a) includes elevating the generator from the foundation and step (b) includes lowering the generator onto the guides.

8. A method according to claim 1 including providing curved guides extending in a horizontal direction and supported by said foundation.

9. A method of removing a generator rotor from a generator housing wherein the generator is supported by a foundation and is disposed axially between gas and steam turbines and wherein said foundation includes a block on one side of the generator, comprising the steps of:
   (a) extending guides through at least one opening in the block;
   (b) releasing the generator from the foundation supporting the generator;
   (c) removing the block from the foundation leaving an open recess through the one foundation side; and
   (d) rotating the generator about a vertical axis and along said guides to displace at least one end of the generator from axial alignment with one of said turbines to enable removal of the rotor from the casing through said open recess without interference from said one of the turbines.

10. A method according to claim 9 including locating the vertical axis offset from an axial centerline of the generator.

11. A method according to claim 10 wherein said vertical axis is located to one side and at one end of the generator.

12. A method according to claim 9 including, reinstalling the generator by subsequent to step (d), rotating the generator about the vertical axis to displace the generator into alignment with the steam and gas turbines, and securing the generator to the generator foundation.

* * * * *